(12) United States Patent
Ono et al.

(10) Patent No.: US 10,928,063 B2
(45) Date of Patent: Feb. 23, 2021

(54) COMBUSTION APPARATUS

(71) Applicant: RINNAI CORPORATION, Aichi (JP)

(72) Inventors: Takahiro Ono, Nagoya (JP); Takashi Ojiro, Nagoya (JP); Masaru Takeuchi, Nagoya (JP)

(73) Assignee: RINNAI CORPORATION, Aichi (JP)

( * ) Notice: Subject to any disclaimer, the term of this patent is extended or adjusted under 35 U.S.C. 154(b) by 379 days.

(21) Appl. No.: 16/063,350

(22) PCT Filed: Oct. 3, 2016

(86) PCT No.: PCT/JP2016/004447
§ 371 (c)(1),
(2) Date: Jun. 18, 2018

(87) PCT Pub. No.: WO2017/110018
PCT Pub. Date: Jun. 29, 2017

(65) Prior Publication Data
US 2018/0363897 A1    Dec. 20, 2018

(30) Foreign Application Priority Data

Dec. 22, 2015 (JP) ............................. JP2015-250325

(51) Int. Cl.
*F23D 14/14* (2006.01)
*F23D 14/02* (2006.01)
(Continued)

(52) U.S. Cl.
CPC ............. *F23D 14/14* (2013.01); *F23D 14/02* (2013.01); *F23L 5/02* (2013.01); *F24H 1/145* (2013.01);
(Continued)

(58) Field of Classification Search
USPC ........................................................ 431/328
See application file for complete search history.

(56) References Cited

U.S. PATENT DOCUMENTS 4,906,180 A * 3/1990 Dvorak .................. F23D 14/14
126/92 AC
5,326,257 A * 7/1994 Taylor .................... F23D 14/14
431/329
(Continued)

FOREIGN PATENT DOCUMENTS

| EP | 2811141 A1 | 12/2014 |
|---|---|---|
| JP | 9-280549 A | 10/1997 |

(Continued)

OTHER PUBLICATIONS

International Search Report and Written Opinion for PCT Patent App. No. PCT/JP2016/004447 (dated Dec. 13, 2016) with English translation of the ISR.

*Primary Examiner* — Kenneth J Hansen
*Assistant Examiner* — John E Bargero
(74) *Attorney, Agent, or Firm* — Cermak Nakajima & McGowan LLP; Tomoko Nakajima

(57) ABSTRACT

A fixing plate for the thermal insulation material is attached to the combustion plate flange part. Provided that a direction leaving away from the air-fuel mixture ejection part of the combustion plate is defined as an outward side direction, there are disposed: on the side edge in the outward side direction of the fixing plate, bent edge parts, which come into contact with the side edge in the outward side direction of the thermal insulation materials; and a plurality of tongue-shaped pressing claws which are elongated from the bent edge part so as to press and prevent the thermal insulation materials from getting released away from the fixing plate.

7 Claims, 8 Drawing Sheets

(51) Int. Cl.
*F23L 5/02* (2006.01)
*F24H 1/14* (2006.01)
(52) U.S. Cl.
CPC .................. *F23D 2203/103* (2013.01); *F23D 2900/14001* (2013.01)

(56) References Cited

U.S. PATENT DOCUMENTS

2009/0226854 A1* 9/2009 Ojiro ...................... F23M 5/085
431/351
2012/0301836 A1* 11/2012 Akagi ..................... F23D 14/14
431/328

FOREIGN PATENT DOCUMENTS

| JP | 2008-075901 A | 4/2008 |
| JP | 2011-196556 A | 10/2011 |

* cited by examiner

COMBUSTION APPARATUS

This application is a national phase entry under 35 U.S.C. § 371 of PCT Patent Application No. PCT/JP2016/00447, filed on Oct. 3, 2016, which claims priority under 35 U.S.C. § 119 to Japanese Patent Application No. 2015-250325, filed Dec. 22, 2015, both of which are incorporated by reference.

TECHNICAL FIELD

The present invention relates to a combustion apparatus comprising: a burner made up of a burner body which is supplied therein with air-fuel mixture, and a sheet-metal combustion plate which covers an open surface of the burner body and which has an air-fuel mixture ejection part; and a combustion box which has, at one end, a connection flange part to be coupled to a body flange part enclosing the open surface of the burner body, and which contains therein a heat exchanger.

BACKGROUND ART

As this kind of combustion apparatus, there is known an apparatus in patent document 1 in which, in order to improve the heat resistivity of the combustion box, water passages as a cooling means for cooling the combustion box are installed in series with the heat exchanger in that portion of the combustion box which lies between the burner and the heat exchanger. Further, in this arrangement, by interposing a packing between a combustion plate flange part on a circumference of the combustion plate and the body flange part, the sealing performance between the combustion plate flange part and the body flange part is secured.

By the way, at the time of combustion by the burner, that portion of the combustion plate flange part which faces an inner space of the combustion box will receive a considerable amount of calorific value. And when overheating of the combustion plate flange part takes place, the temperature of the burner body will reach a considerably high temperature due to transmission of heat from the combustion plate flange part. As a result, accessories of the burner body, e.g., a check valve to be disposed at a flow inlet of the burner body will be subjected to a bad effect due to heat.

Then, although not described in patent document 1, there is also conventionally known one, as shown in FIG. 8, having disposed a thermal insulation material 8 overlapping that portion of the combustion plate flange part 122 which faces the inner space of the combustion box 2. It is thus so arranged that overheating of the combustion plate flange part 122 can be prevented. In this arrangement, a fixing plate 9 for the thermal insulation material is attached to the water passages 5 disposed in that portion of the combustion box 2 which lies between the burner and the heat exchanger. By the way, in the arrangement shown in FIG. 8, there is interposed a first packing $7_1$ between the body flange part 112 and the combustion plate flange part 122, and a second packing $7_2$ is interposed between the combustion plate flange part 122 and the connection flange part 22. Then, in that portion of the combustion plate flange part 122 which faces the inner space of the combustion box 2, the thermal insulation material 8 is overlapped in a state in which the second packing $7_2$ is sandwiched.

It is for the purpose of preventing the overheating of the fixing plate 9 that the fixing plate 9 for the thermal insulation material is attached to on the water passages 5. However, since the water passages 5 are hollow, the fixing plate 9 will have to be attached to the water passages 5 not by spot welding but by a troublesome work of brazing. As a result, the cost for attaching the fixing plate 9 becomes expensive. Further, the thermal insulation material 8 will then be fixed to the combustion box 2 through the fixing plate 9 and the water passages 5. Therefore, when the burner has been assembled to the combustion box 2, positional deviation of the thermal insulation material relative to the combustion plate flange part 122 is likely to occur, thereby giving rise to fluctuation in the thermal insulation effect.

PRIOR ART DOCUMENT

Patent Documents

Patent Document 1: Specification of EP-A-2811141

SUMMARY OF THE INVENTION

Problems that the Invention is to Solve

In view of the above-mentioned points, this invention has a problem of providing a combustion apparatus in which the positional accuracy of the thermal insulation material relative to the combustion plate flange part and the durability of the fixing plate for the thermal insulation material are secured, and also in which the cost for attaching the fixing plate can be reduced.

Means for Solving the Problems

In order to solve the above-mentioned problems, this invention is a combustion apparatus comprising: a burner made up of a burner body which is supplied therein with air-fuel mixture, and a sheet-metal combustion plate which covers an open surface of the burner body and which has an air-fuel mixture ejection part; and a combustion box which has, at one end, a connection flange part to be coupled to a body flange part enclosing the open surface of the burner body and which contains therein a heat exchanger. A packing is interposed between a combustion plate flange part in a circumference of the combustion plate and the body flange part, and there is also disposed a thermal insulation material overlapping that portion of the combustion plate flange part which faces an inner space of the combustion box. The combustion apparatus is characterized in: that a fixing plate for the thermal insulation material is attached to the combustion plate flange part; and that, provided a direction leaving away from the air-fuel mixture ejection part of the combustion plate is defined as an outward side direction, a side edge in the outward side direction of the fixing plate is provided with a bent edge part adapted to come into contact with a side edge in the outward side direction of the thermal insulation material, and also with a plurality of tongue-shaped pressing claws which are elongated from the bent edge parts so as to press and prevent the thermal insulation material from getting released away from the fixing plate.

According to this invention, since the fixing plate for the thermal insulation material is attached to the combustion plate flange part, the positional accuracy of the thermal insulation material relative to the combustion plate flange part can be secured. Therefore, the thermal insulation effect at the combustion plate flange part can surely be obtained. In addition, unlike the conventional example in which the fixing plate is attached to the hollow water passages, the attaching of the fixing plate in this invention can be performed by an extremely convenient way of spot welding as compared with brazing. Accordingly, the cost for attaching the fixing plate can be reduced. In addition, since the fixing plate is covered with the thermal insulation material, the fixing plate can be prevented from getting overheated, thereby securing durability of the fixing plate. Further, although the pressing claws are not covered by the thermal insulation material, the pressing claws are disposed in the bent edge parts which are in the outward side direction away from the air-fuel mixture ejection part of the combustion plate. Therefore, not much calorific value will be inputted into the pressing claws. As a result, the pressing claws can also be prevented from getting overheated.

By the way, it is also possible to form the fixing plate and the thermal insulation material in the form of a picture frame which extend over the entire circumference of the combustion plate flange part. However, such an arrangement requires that the fixing plate and the thermal insulation material be pressed from a raw material into the shape of a picture frame, thereby giving rise to a large amount of scraps and, consequently, resulting in higher material costs.

Therefore, in the combustion apparatus of this invention, as the thermal insulation material, preferably there are disposed: a pair of first strip thermal insulation materials overlapping those portions of the combustion plate flange part which lie along first opposite sides that are predetermined set of opposite sides of a square which is a profile shape of the combustion plate; a pair of second strip thermal insulation materials overlapping those portions of the combustion plate flange part which lie along second opposite sides that are the other set of opposite sides of the square. The strip fixing plate for fixing the first thermal insulation materials is attached to those portions of the combustion plate flange part which lie along the first opposite sides. Each longitudinal end part of the fixing plate is provided with: a second bent edge part which comes into contact with a side edge in the outward side direction of each longitudinal end part of the second thermal insulation material; and a tongue-shaped second pressing claw which is elongated from the second bent edge part and which presses and prevents each longitudinal end part of the second thermal insulation material from getting released away from the fixing plate. According to this arrangement, the costs for the thermal insulation materials can be reduced and, furthermore, by omitting the fixing plates to be mounted on those portions of the combustion plate flange parts lying along the second opposite sides, the costs for the material cost of the fixing plates can also be reduced to the extent possible. Therefore, the above arrangement is advantageous in attempting a cost reduction.

Preferably, the combustion plate is disposed to cover a downward open surface of the burner body and, in case the profile shape of the combustion plate is a rectangle, the first opposite sides are long sides of the rectangle. According to this arrangement, the second thermal insulation material will be overlapped with those portions of the combustion plate flange parts which lie along the short sides, i.e., the second opposite sides, of the rectangle. The second thermal insulation materials will thus become shorter in length. As a result, even if the second thermal insulation materials are arranged to be pressed only by the second pressing claws at the end portions of the second thermal insulation materials, the second thermal insulation materials will be prevented from deflecting downward due to their own weight.

Furthermore, according to this invention, preferably the bent edge part of the fixing plate is provided with that projected part for positioning purpose which comes into contact with, or lies to face adjacent to an inner wall surface of the combustion box. It is to be noted here that, unless the fixing plate is attached to the combustion plate flange part, even if the connection flange part of the combustion box is overlapped with the combustion plate flange part, possible deviations of the combustion box along the surface directions of the combustion plate flange part and connection flange part, cannot be restrained. As a result, the positional accuracy of the combustion box relative to the combustion plate cannot be secured any longer. On the other hand, once the fixing plate is attached to the combustion plate flange part, the bent edge part of the fixing plate will lie to face the inner wall surface of the combustion box. By providing this bent edge part with the projection part as described above, the deviation of the combustion box can be restrained, and the positional accuracy of the combustion box relative to the combustion plate can be secured.

Further, according to this invention, preferably a positioning hole is formed in that portion of the fixing plate which overlaps a predetermined pressing claw, out of the plurality of pressing claws, and a projected part formed in the combustion plate flanged part gets fitted into the positioning hole, whereby the fixing plate is positioned relative to the combustion plate flange part. Here, the thermal insulation material will be pushed upward by the tip of the projected part protruding out of the positioning hole, but will be pressed downward by the predetermined pressing claws at the lifted portion of the thermal insulating material. As a result, the lifting up, beyond the fixing plate, of the thermal insulation material in a portion other than the positioning hole can be prevented.

Further, in this invention, preferably the plurality of pressing claws are connected to one another by a bridge part bridging over those base parts of the pressing claws which are on the side of the bent edge part of these pressing claws. According to this arrangement, when the plurality of pressing claws are bent after the thermal insulation material has been set in position on the fixing plate, thereby pressing the thermal insulation material by bending the bridge parts relative to the bent edge part, the plurality of pressing claws are caused to be bent at the same time. Therefore, as compared with an arrangement in which the plurality of pressing claws are individually bent one at a time, the workability is improved. Further, the thermal insulation material comes to be uniformly pressed by means of a plurality of pressing claws.

By the way, even if the fixing plate is attached to the combustion plate flange part by spot welding and the like, the fixing plate has the possibility of falling away from the combustion plate flange part by fatigue fracture, due to thermal stress, of the attached portion. Therefore, in this invention, preferably a stepped part is provided in a manner to protrude inward in that portion of the combustion box which is positioned below the fixing plate, and the fixing plate is provided with a catching part which, in case the fixing plate falls away from the combustion plate flange part, will be caught by the stepped part so as to prevent the fixing plate from dropping.

EMBODIMENTS FOR CARRYING OUT THE INVENTION

Figure 1:
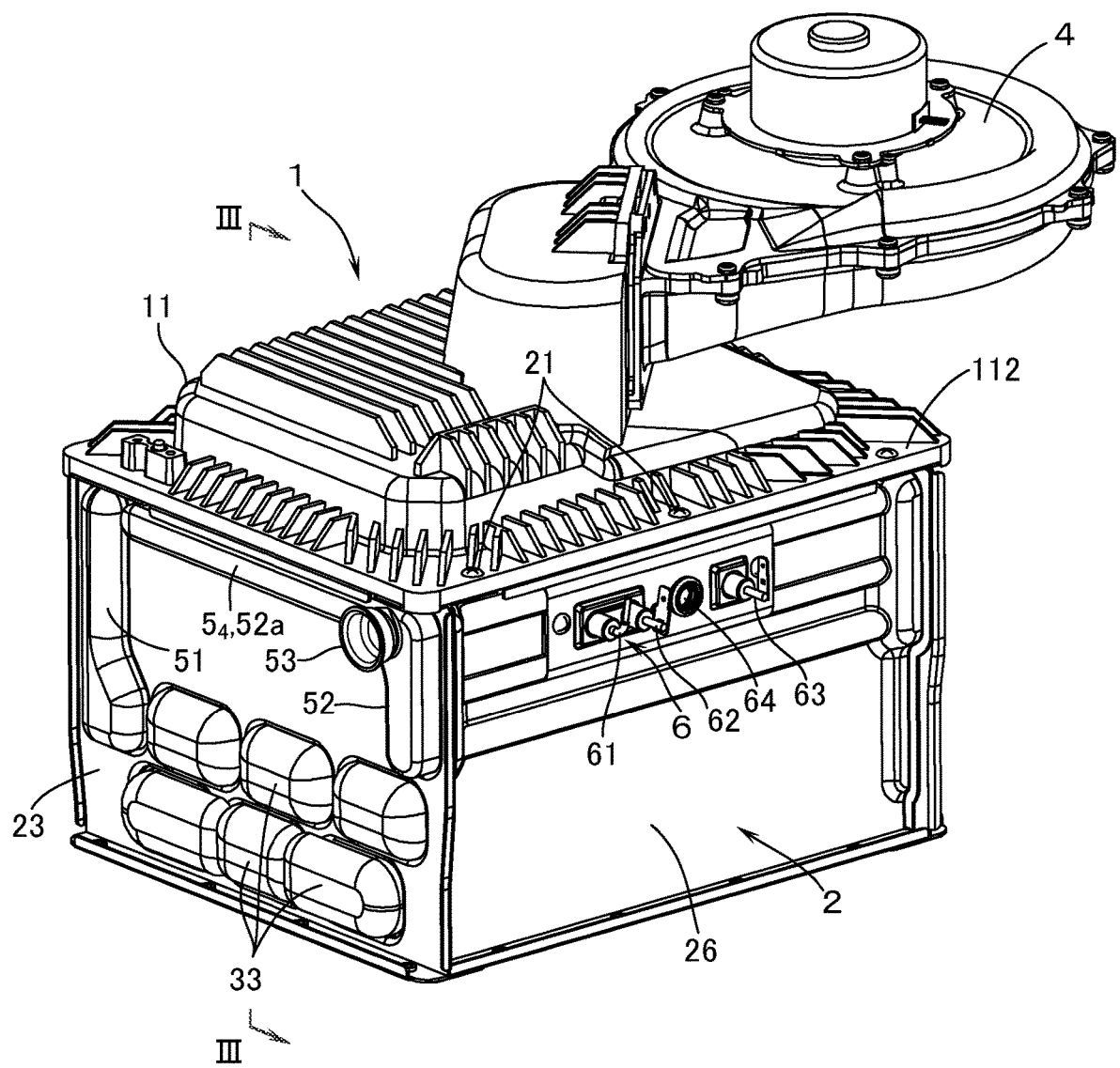
FIG. 1 is a perspective view of a combustion apparatus of an embodiment of this invention.

With reference to FIG. 1 to FIG. 4, a combustion apparatus according to an embodiment of this invention is provided with: a burner 1 made up of a burner body 11 which is supplied inside thereof with air-fuel mixture (mixture gas of fuel gas and primary air), and a sheet-metal combustion plate 12 which covers a downward open surface 111 of the burner body 11; and a combustion box 2 which has, at an upper end, a connection flange part 22 to be coupled, with machine screws 21, to a body flange part 112 which encloses the open surface 111 of the burner body 11. The combustion box 2 contains, inside thereof, a heat exchanger 3 for supplying hot water.

The burner body 11 has opened therein an inlet port 113 to which is connected a fan 4 for supplying air-fuel mixture. The inlet port 113 has mounted therein a check valve 13 which prevents, at the time of the fan 4 stopping, the air-fuel mixture staying inside the burner body 11 from flowing back toward the fan 4. The check valve 13 is constituted by: a resin valve box 131 to be fitted into the inlet port 113; and a resin valve plate 132 mounted in that opening of the valve box 131 which faces inside the burner body 11 so as to be swingable about an axis between opened and closed postures.

The combustion plate 12 has a large opening in the center thereof. This opening has mounted therein a canvass 121a made of heat-resistant fiber and mounted thereon, in a manner overlapping each other, a distribution plate 121b which has formed therein a multiplicity of distribution holes. An ejection part 121 for the air-fuel mixture is thus constituted by the canvass 121a and the distribution plate 121b. The air-fuel mixture supplied by the fan 4 into the burner body 11 is ejected out of the air-fuel ejection part 121 to thereby perform totally primary air combustion. By the way, it is also possible to form a multiplicity of burner ports in the combustion plate having no large opening so that these burner ports constitute the air-fuel mixture ejection part.

The heat exchanger 3 is constituted by a fin-tube type of heat exchanger having: a multiplicity of fins 31; and a plurality of heat absorbing tubes 32 which penetrate through these fins 31. On outside surfaces of laterally one-side and the opposite-side side plates 23, 24 of the combustion box 2, there are mounted a plurality of connection covers 33 which define, together with each of the side plates 23, 24, connection passages for the adjoining two heat absorbing tubes 32, 32. By means of these connection passages, all of the heat absorbing tubes 32 are connected in series with each other. In addition, a water inlet port 34 is disposed in the connection covers 33 which define, between the laterally opposite-side side plate 24, a connection passage to be connected to an upstream-end heat-absorbing tube 32.

Figure 2:
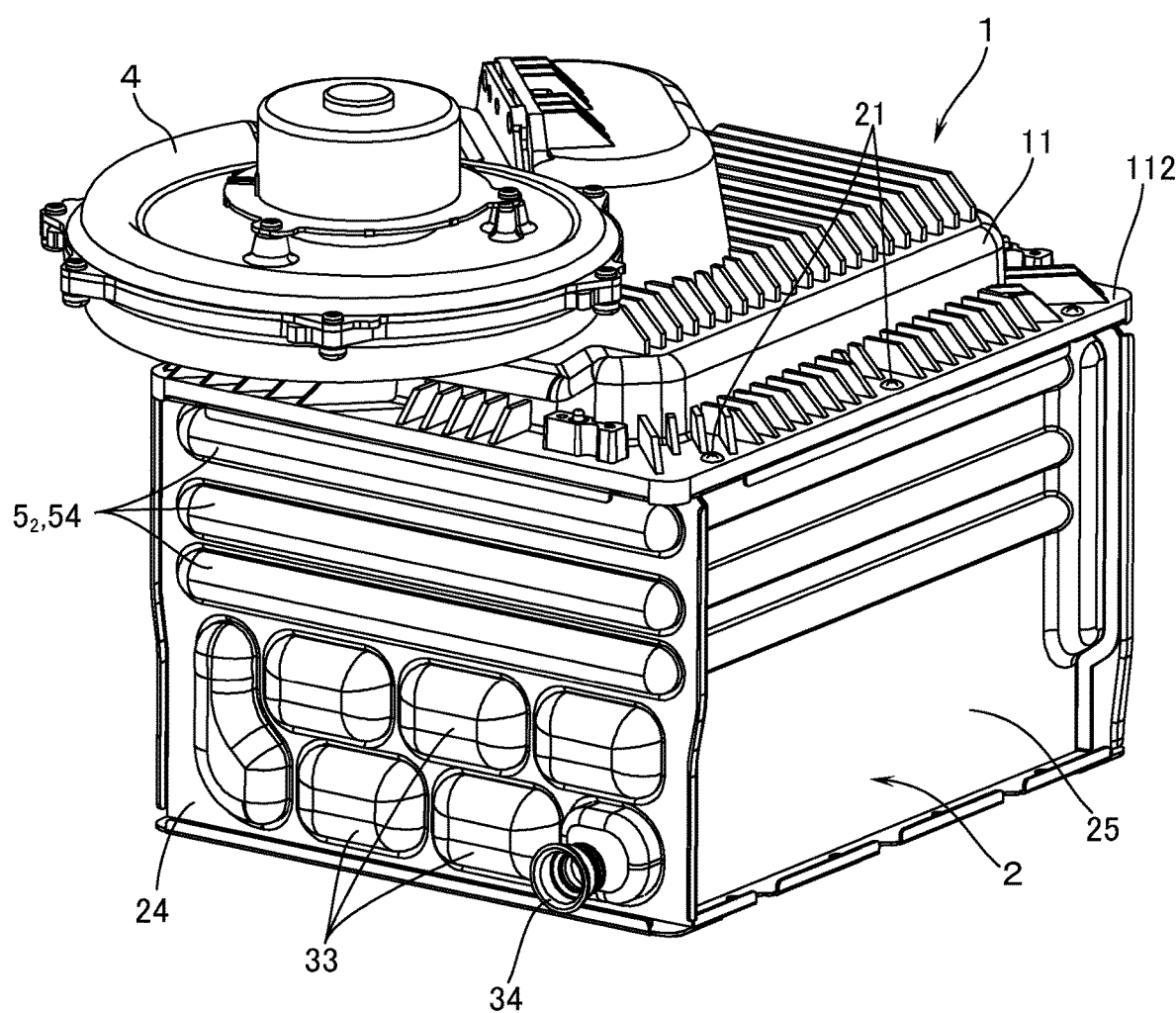
FIG. 2 is a perspective view of the combustion apparatus of the embodiment as viewed from a side opposite to that in FIG. 1.
Figure 3:
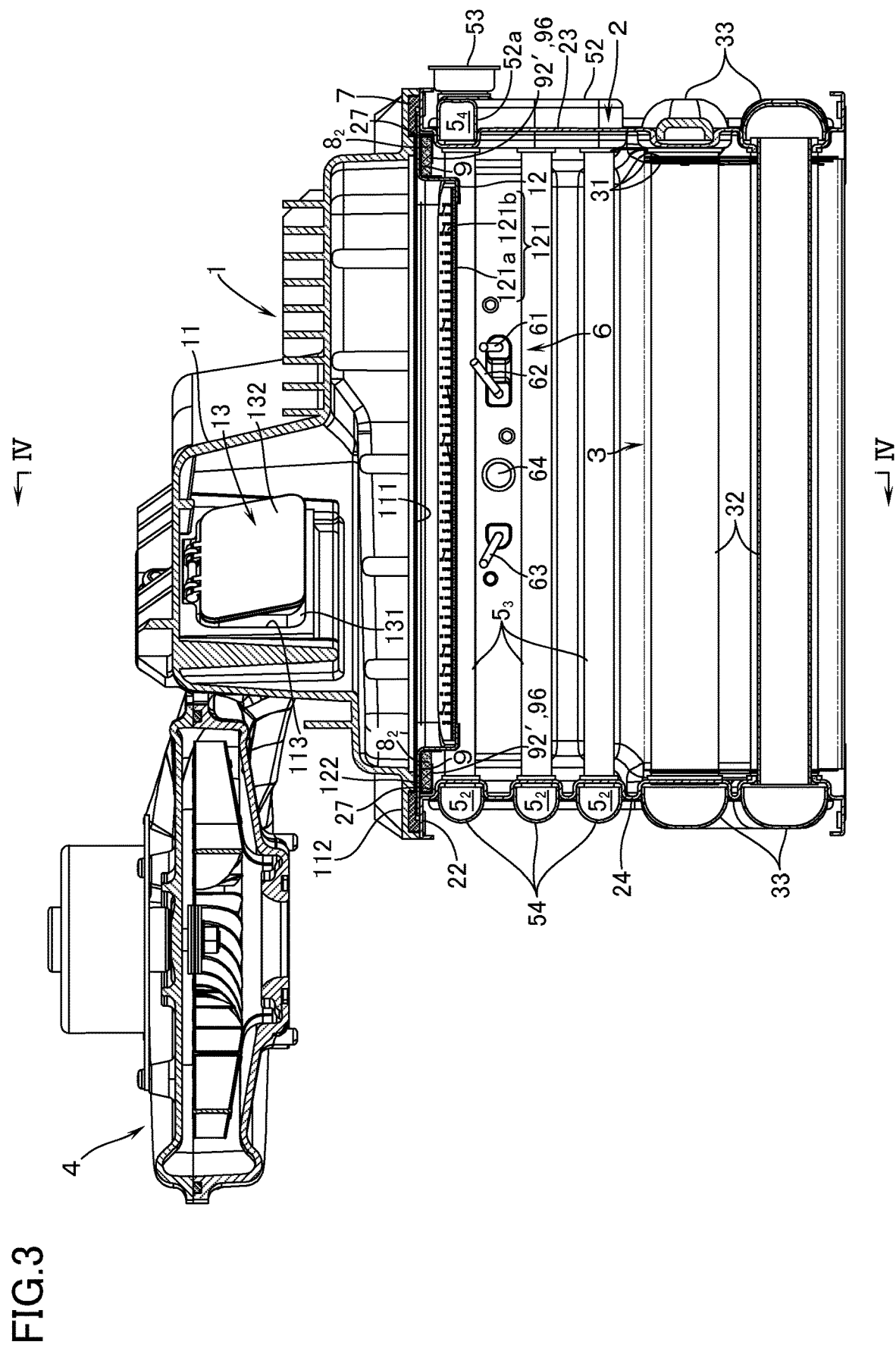
FIG. 3 is a sectional view cut away along the line III-III in FIG. 1.
Figure 4:
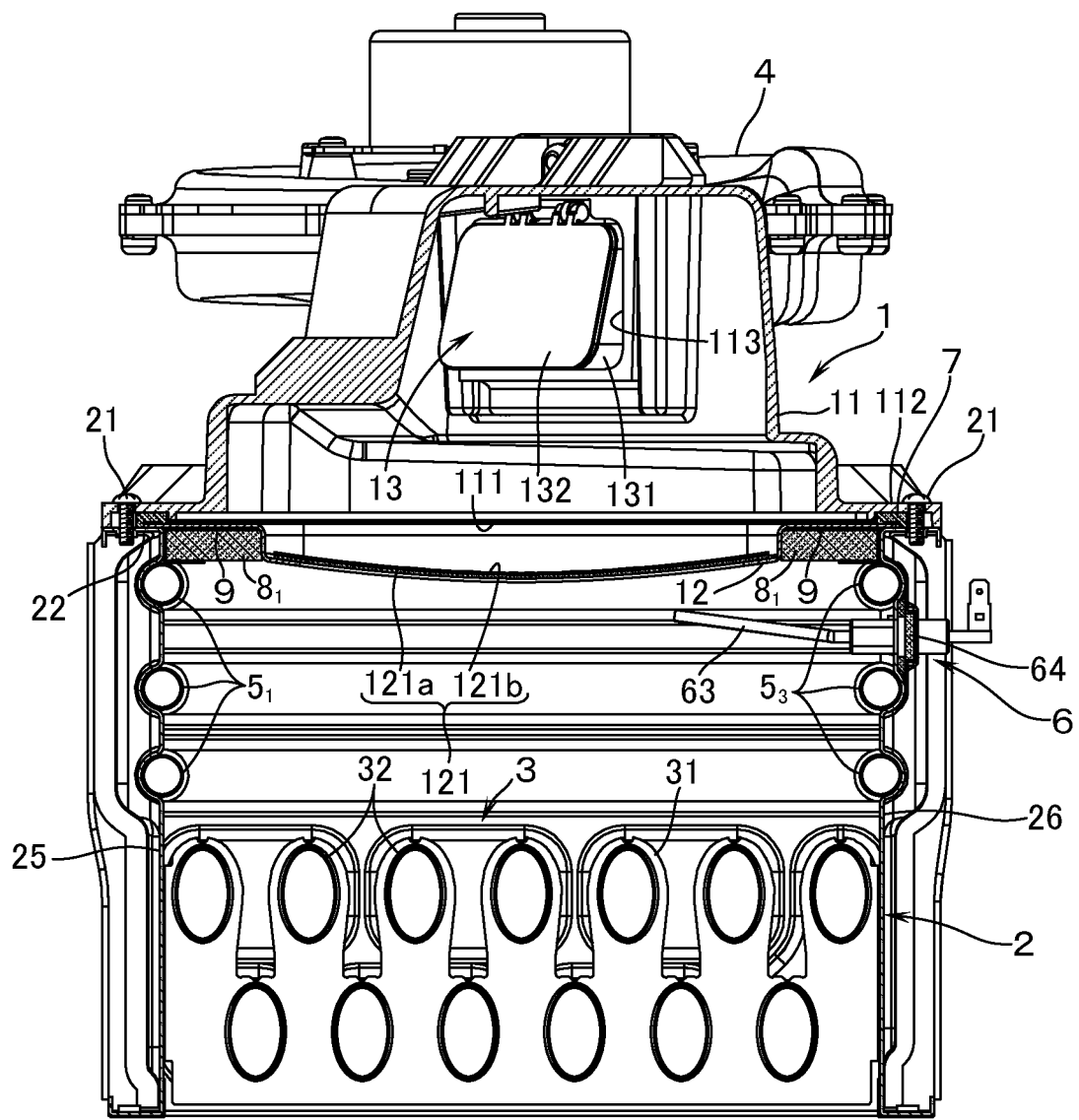
FIG. 4 is a sectional view cut away along the line IV-IV in FIG. 3.

Further, on an inside of that portion of the rear-side side plate 25 of the combustion box 2 which is above the heat exchanger 3, there are respectively vertically arranged three pieces of first water passages $5_1$, made of tubes, in a manner to be in contact with the side plate 25. Also on an inside of that portion of the front-side side plate 26 of the combustion box 2 which is above the heat exchanger 3, there are respectively vertically arranged three pieces of third water passages $5_3$ in a manner to be in contact with the side plate 26. Further, on an outside surface of the laterally one-side side plate 23 of the combustion box 2, there are mounted: an inlet-side header cover 51 which defines, together with the side plate 23, a connection passage between the vertically arranged three pieces of first water passages $5_1$ and the downstream-end heat absorbing tube 32 of the heat exchanger 3; and an outlet-side header cover 52 which defines, together with the side plate 23, a connection passage for the vertically arranged three pieces of third water passages $5_3$. The outlet-side header cover 52 is provided with a hot water outlet port 53. The laterally opposite-side side plate 24 of the combustion box 2 is provided, as shown in FIG. 2 and FIG. 3, with vertically arranged three pieces of second water passages $5_2$ which connect together the three pieces of first water passages $5_1$ and the three pieces of third water passages $5_3$. Each of the second water passages $5_2$ is constituted by dents formed in the side plate 24 so as to be dented laterally inward, and a cover 54 mounted on an outside surface of the side plate 24 so as to cover the dents. Then, water supplied from the water inlet port 34 is heated by the heat exchanger 3 and the heated water is flowed out from the hot water outlet port 53 through the connection passages inside the inlet-side header cover 51, the first water passages $5_1$, the second water passages $5_2$, the third water passages $5_3$, and the connection passage inside the outlet-side header cover 52. Further, the laterally one-side side plate 23 of the combustion box 2 is provided with a fourth water passage $5_4$ which is extended rearward from an upper part of the connection passage inside the outlet-side header cover 52 and which is constituted by a laterally inward dent formed in the side plate 23 and a cover 52a integral with the outlet-side header cover 52 which covers the dent. Then, by means of the water to flow through the first through the fourth water passages $5_1$~$5_4$, each of the side plates 23~26 is arranged to be cooled.

The front-side side plate 26 of the combustion box 2 has mounted thereon an electrode component 6 having an ignition electrode 61, a ground electrode 62, and a flame rod 63, all penetrating the side plate portions between No. 1 and No. 2, i.e., totally two, third water passages $5_3$, $5_3$ counted from the top to thereby protrude into the combustion box 2. By the way, the electrode component 6 is additionally provided with an inspection window 64 which enables visual confirmation inside the combustion box 2.

Figure 5:
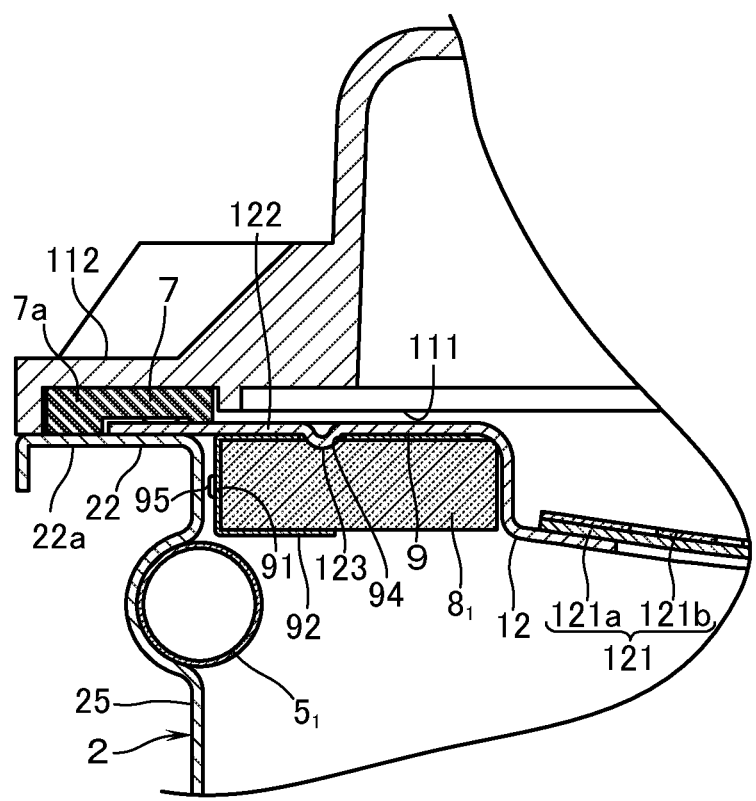
FIG. 5 is an enlarged sectional view of an essential portion of the combustion apparatus of the embodiment.

As clearly shown in FIG. 5, in the circumference of the combustion plate 12, there is disposed a combustion plate flange part 122 which is offset upward relative to the air-fuel mixture ejection part 121. Between this combustion plate flange part 122 and the body flange part 112, there is interposed a packing 7 to secure sealing property between the combustion plate flange part 122 and the body flange part 112. The outer circumference of the combustion plate flange part 122 is positioned on the inner side of the outer circumference of the body flange part 112. Further, the connection flange part 22 has a protruded part 22a which protrudes outward beyond the outer circumference of the combustion plate flange part 122. The packing 7 also has a protruded part 7a which protrudes outward beyond the outer circumference of the combustion plate flange part 122. Then, the protruded part 7a of the packing 7 is interposed between the protruded part 22a of the connection flange part 22 and the body flange part 112 to secure sealing property between the connection flange part 22 and the body flange part 112. Further, the inner circumference of the connection flange part 22 is positioned in a midpoint between the inner circumference and the outer circumference of the combustion plate flange part 122. The connection flange part 22 is thus arranged to be in direct contact with that portion of the combustion plate flange part 122 which is outside the inner circumference of the connection flange part 22.

By the way, at the time of weak combustion at which the amount of air-fuel mixture inside the burner body 11 is small, the cooling function by the air-fuel mixture is reduced and, therefore, the heat is likely to be accumulated in the burner body 11. Further, the sheet-metal combustion plate 12 will rise to a considerably high temperature. As a result, when the heat of the combustion plate 12 is transmitted to the burner body 11, the burner body 11 will rise to a considerably high temperature. As a consequence, the check valve 13, which is an auxiliary part of the burner body 11, will be subjected to a bad effect due to heat. As in this embodiment, if the connection flange part 22 is arranged to be in direct contact with the combustion plate flange part 122, the cold by the water passages $5_1$~$5_4$ be transmitted to the combustion plate flange part 22 through the connection flange part 22. The heat transmission from the combustion plate 12 to the burner body 11 can be restrained to a certain degree. But if the amount of heat input into that portion of the combustion plate flange part 122 which is positioned on the inner side of the connection flange part 22, i.e., into that portion of the connection plate flange part 122 which faces the inner space of the combustion box 2 becomes larger, the temperature rise of the burner body 11 cannot be sufficiently restrained due to overheating of the combustion plate flange part 122.

Figure 6A:
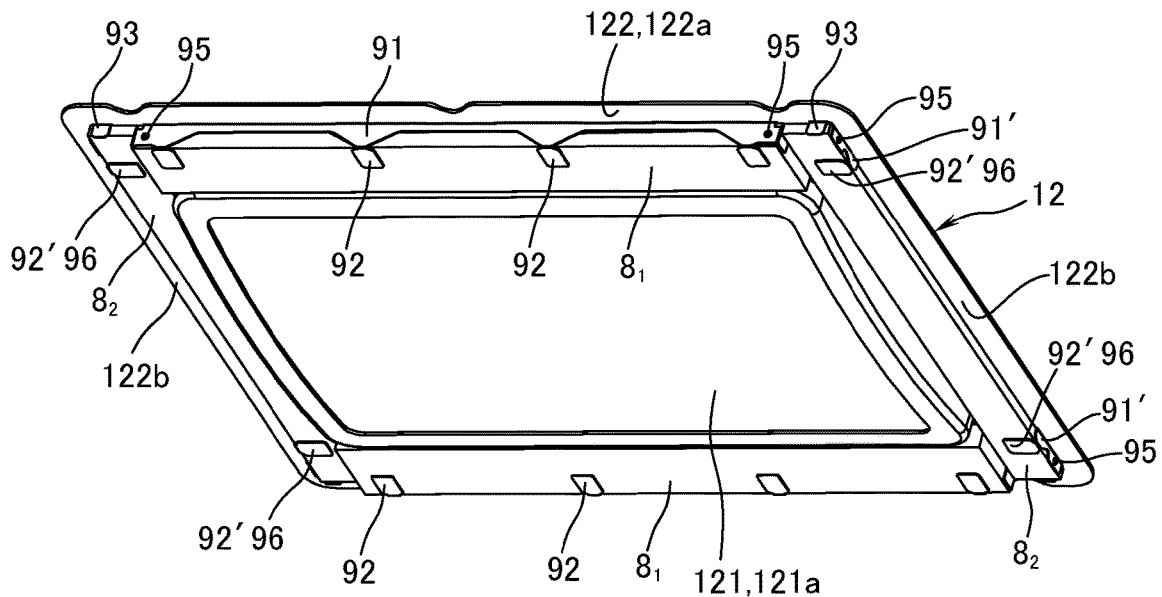
FIG. 6(a) is a perspective view of the combustion apparatus of the embodiment, in a state in which a thermal insulation material for the combustion plate has been fixed, and 6(b) is a perspective view thereof in a state in which the thermal insulation material has been separated.
Figure 6B:
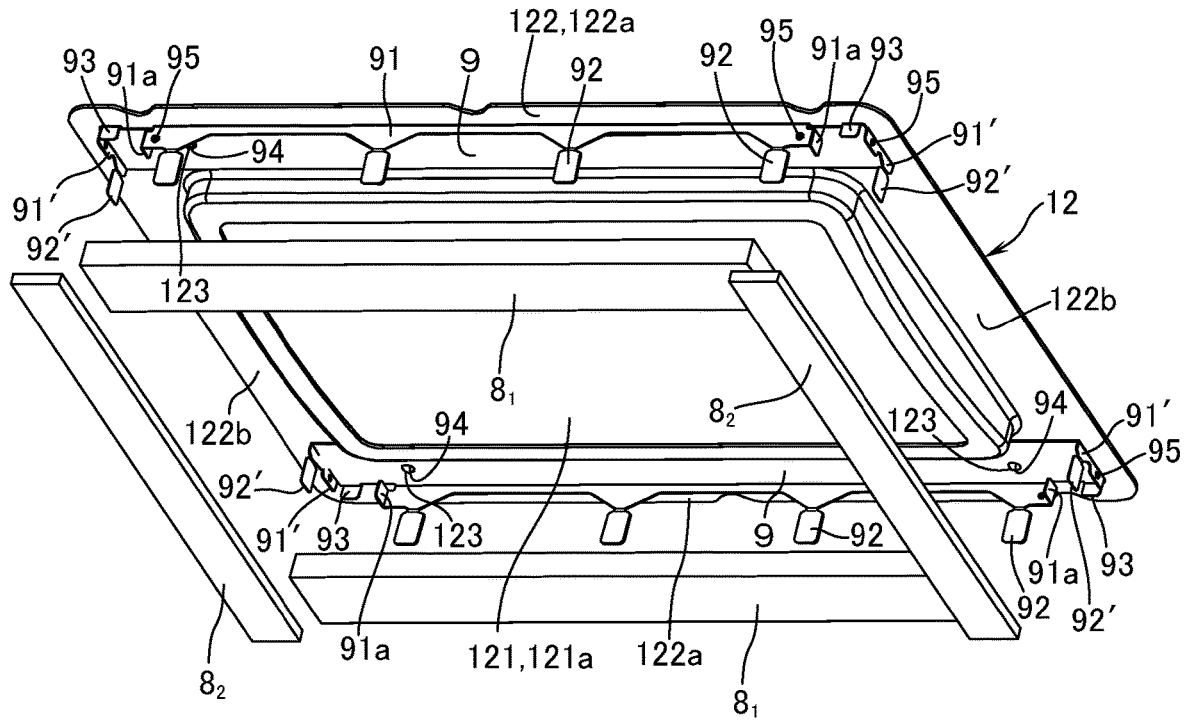

Then, in this embodiment, there is disposed a thermal insulation material overlapping that portion of the combustion plate flange part 122 which faces an inner space of the combustion box 2. In this manner, the combustion plate flange part 122 is prevented from getting overheated. A description will now be made of this point with reference to FIG. 6.

The profile shape of the combustion plate 12 is a rectangle. First opposite sides that are predetermined set of opposite sides of this rectangle are defined to be long sides of the rectangle, and second opposite sides that are the other set of opposite sides of the rectangle are defined to be short sides. In this embodiment, as the thermal insulation materials, there are disposed: a pair of first strip thermal insulation materials $8_1$, $8_1$ overlapping those portions 122a, 122a of the combustion plate flange part 122 which lie along the first opposite sides; and a pair of second strip thermal insulation materials $8_2$, $8_2$ overlapping those portions 122b, 122b of the combustion plate flange part 122 which lie along the second opposite sides. It is also possible to constitute the thermal insulation materials by an integral article like a picture frame which is elongated over an entire circumference of the combustion plate flange part 122. However, according to such an arrangement, it will be necessary to press the thermal insulation material from a raw material into the shape of a picture frame. This manufacturing process gives rise to the generation of a large amount of scraps, resulting in an increase in the material costs. On the other hand, if the thermal insulation material is constituted by the first and the second strip thermal insulation materials $8_1$, $8_2$, as in this embodiment, those parts of the raw material which become scraps can be reduced, and the material costs can be saved.

Further, according to this embodiment, in that portion 122a of the combustion plate flange part 122 which is along the first side, there is attached a strip fixing plate 9 which fixes in position the first thermal insulation material $8_1$. Provided that a direction leaving away from the air-fuel mixture ejection part 121 of the combustion plate 12 is defined as an outward side direction, there are disposed: on a side edge in the outward side direction of the fixing plate 9, a bent edge part 91 which comes into contact with the side edge in the outward side direction of the first thermal insulation material $8_1$; and a plurality of tongue-shaped pressing claws 92 which are elongated from the bent edge part 91 in a manner to press the first thermal insulation material $8_1$ so as not to get released away from the fixing plate 9. By the way, the longitudinal end part of the bent edge part 91 is provided, in a bent manner, with a bent edge part 91a which comes into contact with a longitudinal end surface of the first thermal insulation material $8_1$. Further, each longitudinal end part of the fixing plate 9 is provided with: a second bent edge part 91' which comes into contact with outward side edge of each longitudinal end part of the second thermal insulation material $8_2$; a tongue-shaped second pressing claw 92' which is elongated from the second bent edge part 91' and which presses each longitudinal end part of the second thermal insulation material $8_2$ so as not to get released away from the fixing plate 9; and a bent part 93 which comes into contact with the longitudinal end surface of the second thermal insulation material $8_2$. Each of the pressing claws 92, 92' is bent, after having set in position each of the first and the second thermal insulation materials $8_1$, $8_2$, thereby pressing each of the thermal insulation materials $8_1$, $8_2$ in position.

It is to be noted that the fixing plate 9 can alternatively be constituted by an integral item like a picture frame extending over an entire circumference of the combustion plate flange part 122. However, this arrangement requires that the fixing plate 9 be pressed from a raw material into the shape of a picture-frame. This solution gives rise to a large amount of scraps, resulting in higher costs for the material. On the other hand, according to this embodiment, by making the fixing plate 9 into a band shape and by omitting the fixing plate to be attached to the portions 122b of the combustion plate flange parts 122 along the second opposite sides, the material costs for the fixing plate 9 can be reduced to the extent possible. Therefore, this embodiment is advantageous in attempting a cost reduction.

By the way, since the second opposite sides happen to be short sides of a rectangle that is the profile shape of the combustion plate 12, the second thermal insulation materials $8_2$ overlapping those portions 122b of the combustion plate flange parts 122 which lie along the second opposite sides become shorter. Therefore, even if the second thermal insulation materials $8_2$ are pressed only by the second pressing claws 92' at the end parts, the second thermal insulation materials $8_2$ can be restrained from deflecting downward due to its own weight.

By the way, it is also conceivable to attach the fixing plates for the thermal insulation materials to the water passages $5_1$~$5_4$. According to this arrangement, however, the fixing plates will have to be attached to the water passages $5_1$~$5_4$ by a troublesome work of brazing, resulting in higher costs for attaching the fixing plate. In addition, the thermal insulation materials will be fixed to the combustion box 2 through the fixing plates and the water passages $5_1$~$5_4$. As a result, at the time of assembling the burner 1 to the combustion box 2, positional deviation of the thermal insulation materials relative to the combustion plate flange parts 122 is likely to occur, resulting in fluctuations in the thermal insulation effect.

On the other hand, according to this embodiment, since the fixing plates 9 for the thermal insulation materials are attached to the combustion plate flange parts 122, the positional accuracy of the thermal insulation materials $8_1$, $8_2$ relative to the combustion plate flange parts 122 can be secured. As a result, the thermal insulation effect on the combustion plate flange parts 122 can surely be secured. In addition, the attaching of the fixing plates 9 can be performed by means of spot welding that is remarkably simpler and more convenient than the work of brazing, thus reducing the costs for attaching the fixing plates 9. Further, since the fixing plates 9 are covered by the thermal insulation materials $8_1$, $8_2$, the fixing plates 9 can be prevented from getting overheated, thereby securing durability. Although not covered by the thermal insulation materials $8_1$, $8_2$, the pressing claws 92, 92' are disposed at the bent edge parts 91, 91' on those outward side direction of the fixing plates 9 which are away from the air-fuel mixture ejection part 121 of the combustion plate 12. Therefore, not much heat will be inputted into the pressing claws 92, 92'. As a result, the pressing claws 92, 92' can also be prevented from getting overheated.

Further, in this embodiment, a positioning hole 94 is formed in that portion of each fixing plate 9 which overlaps, out of the plurality of pressing claws 92 for pressing the first thermal insulation material 81, a predetermined pressing claw 92 that is positioned near a longitudinal end of the first thermal insulation material $8_1$. Then, as clearly shown in FIG. 5, a projected part 123 formed in the combustion plate flanged part 122 gets fitted into the positioning hole 94, whereby the fixing plate 9 is arranged to be positioned relative to the combustion plate flange part 122. By the way, by means of the tip of the projected part 123 that protrudes beyond the positioning hole 94, the first thermal insulation material $8_1$ is pushed up. However, since that portion of the first thermal insulation material $8_1$ which has been pushed up will be pushed down by the predetermined pressing claw part 92, the first thermal insulation material $8_1$ can be prevented from getting lifted off from the fixing plate 9 at portions other than the positioning hole 94.

By the way, unless the fixing plate 9 is attached to the combustion plate flange part 122, even if the connection flange part 22 of the combustion box 2 is placed on top of the combustion plate flange part 122, the combustion box 2 cannot be restrained from deviating in the surface direction of the combustion plate flange part 122 and the connection flange part 22. Then, due to the positional deviation of the combustion box 2 relative to the combustion plate 12, the positional accuracy of the electrical component 6, attached to the combustion box 2, relative to the combustion plate 12 can no longer be secured. On the other hand, if the fixing plate 9 is attached to the combustion plate flange part 122, the bent edge parts 91, 91' of the fixing plate 9 will face the inner wall surface of the combustion box 2. Then, in this embodiment, the bent edge parts 91, 91' are provided with a projected part 95, for positioning, coming into contact with, or lying close to face the inner wall surface of the combustion box 2. According to this arrangement, the positioning deviation of the combustion box 2 relative to the combustion plate 12 can be prevented, and the positional accuracy of the electric component 6 relative to the combustion plate 12 can be secured.

In addition, even if the fixing plate 9 is attached to the combustion plate flange part 122 by means of spot welding and the like, the fixing plate 9 may have the possibility of falling away from the combustion plate flange part 122 by fatigue fracture at the attached portion due to thermal stresses. As a solution, in this embodiment, the combustion box 2 is provided, in a portion positioned below the fixing plate 9, with a stepped part 27 in a manner to protrude inward, and also the fixing plate 9 is provided with a catching part 96 which, in case the fixing plate 9 falls away from the combustion plate flange part 122, will be caught by the stepped part 27 so as to prevent the fixing plate 9 from dropping. In a more detailed description with reference to FIG. 3, the stepped part 27 is constituted by: an upper surface of a laterally inward dent formed in that portion of the laterally one-side side plate 23 of the combustion box 2 which coincides with the fourth water passages $5_4$; and an upper surface of a laterally inward dent formed in that portion of the laterally opposite-side side plate 24 of the combustion box 2 which coincides with the uppermost second water passages $5_2$. The catching part 96 is constituted by the second pressing claw 92' at the longitudinal end of the fixing plate 9.

By the way, in the above-mentioned embodiment, a plurality of pressing claws 92 to press the first thermal insulation materials 81 are independent of one another. Therefore, it is necessary to independently bend the plurality of pressing claws 92 after having set in position the first thermal insulation materials $8_1$ on the fixing plates 9. It follows that the work is time consuming and, due to fluctuations in bending of the pressing claws 92, it becomes difficult to uniformly press the first thermal insulation material $8_1$ with the plurality of pressing claws 92.

Figure 7:
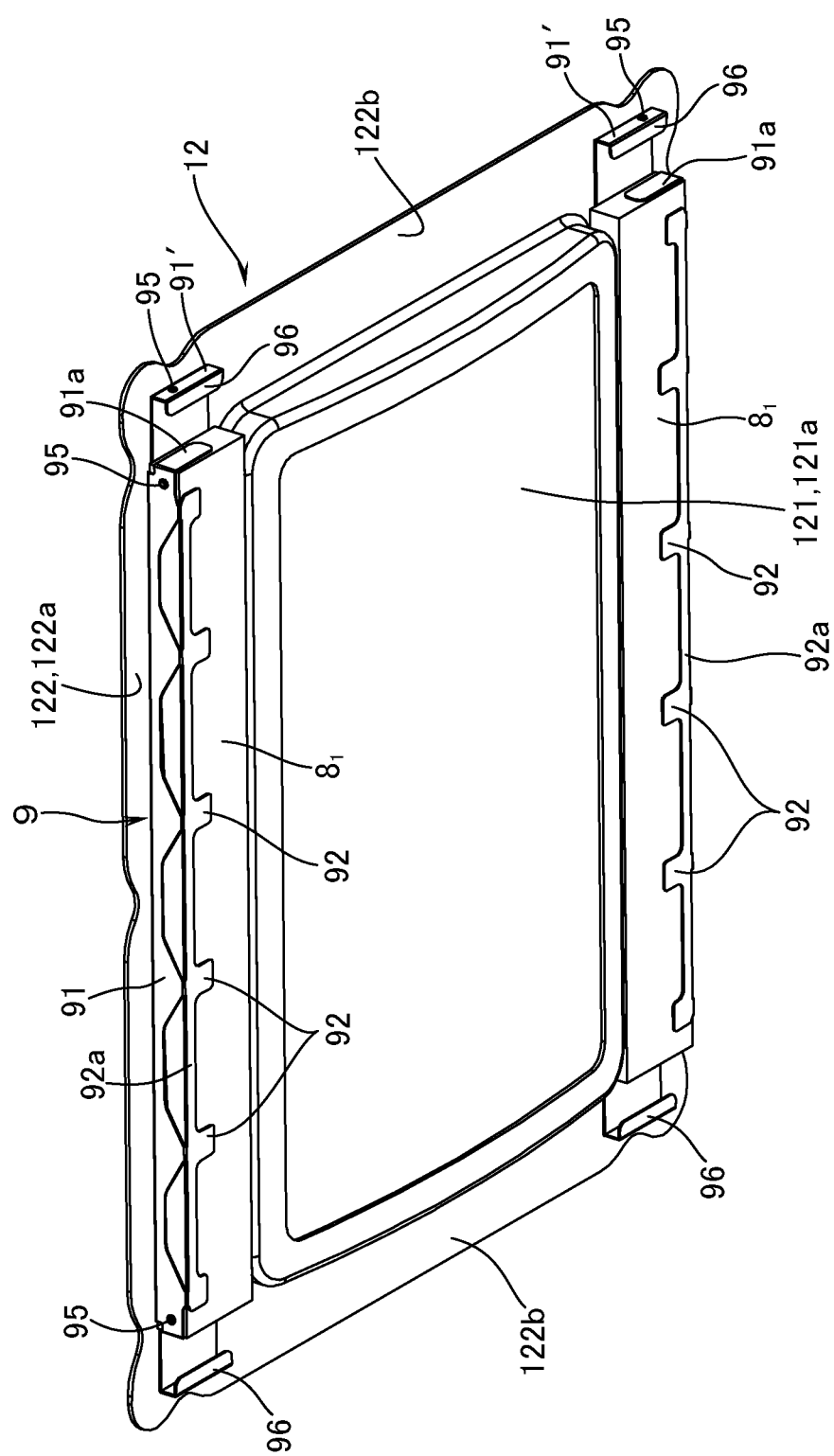
FIG. 7 is a perspective view of the combustion apparatus of the embodiment, in a state in which the thermal insulation material of the combustion plate has been fixed.
Figure 8:
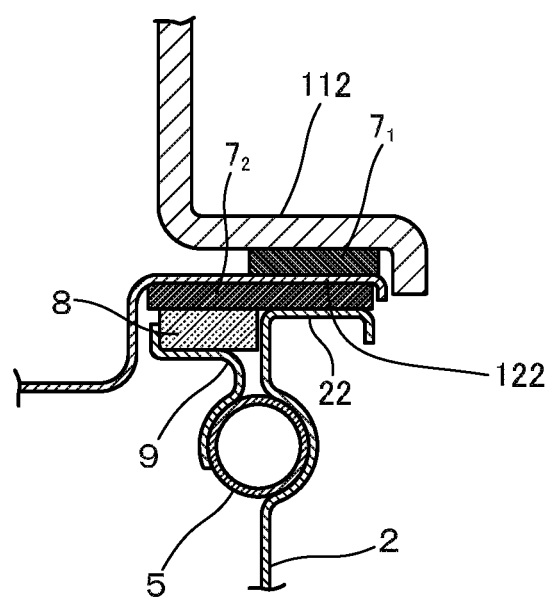
FIG. 8 is an enlarged sectional view of an essential part of a conventional example.

In order to eliminate this kind of disadvantages, according to the embodiment shown in FIG. 7, the plurality of pressing claws 92 to press the first thermal insulation material $8_1$ are arranged to be coupled to one another by means of a bridge part 92a that extends over base ends on the side of the bent edge parts 91 of the pressing claws 92. According to this arrangement, by bending the bridge part 92a relative to the bent edge part 91 after having set the thermal insulation material $8_1$ on the fixing plate 9, the plurality of pressing claws 92 will be bent in a lump. Therefore, as compared with an example in which a plurality of pressing claws 92 are individually bent, the workability is improved and, further, the first thermal insulation material $8_1$ comes to be uniformly pressed by the plurality of pressing claws 92.

By the way, in the embodiment as shown in FIG. 7, there has been omitted the second thermal insulation materials $8_2$ overlapping that portion 122b of the combustion plate flange part 122 which lie along the second opposite sides as the short sides. However, in the ends, in the longer direction, of the fixing plate 9 there are formed the second bent edge part 91' in a similar manner as in the above-mentioned embodiment, and this bent edge part 91' is provided with a projected part 95 for positioning purpose. Further, at the tip of the bent edge part 91' there is formed a catching part 96 which is arranged to be caught by the stepped part 27 of the combustion box 2.

Descriptions have so far been made of the embodiments of this invention with reference to the drawings. This invention shall, however, be not limited to the above. For example, in the above-mentioned embodiment, the combustion box 2 houses therein the heat exchanger 3 for hot water supply. Heat exchangers other than for hot water supply, e.g., for space heating and the like may also be housed in the combustion box 2. Furthermore, in the above-mentioned embodiment, the burner body 11 has formed therein an open surface 111 which faces downward. This invention, however, is also applicable to a combustion apparatus in which the burner is disposed such that the open surface faces upward.

EXPLANATION OF MARKS

1 burner
11 burner body
111 opening surface
112 body flange part
12 combustion plate
121 air-fuel mixture ejection part
122 combustion plate flange part
122*a* that portion of the combustion plate flange part which lies along a first opposite side
122*b* that portion of the combustion plate flange part which lies along a second opposite side
123 projected part
2 combustion box
22 connection flange
27 stepped part
7 packing
8$_1$ first thermal insulation material
8$_2$ second thermal insulation material
9 fixing plate
91 bent edge part
91' first pressing claw
92 pressing claw
92*a* bridge part
92' second pressing claw
94 positioning hole
95 projected part
96 catching part

The invention claimed is:

1. A combustion apparatus comprising:
    a burner made up of a burner body which is supplied therein with air-fuel mixture, and a sheet-metal combustion plate which covers an open surface of the burner body and which has an air-fuel mixture ejection part; and a combustion box which has, at one end, a connection flange part to be coupled to a body flange part enclosing the open surface of the burner body and which contains therein a heat exchanger;
    wherein a packing is interposed between a combustion plate flange part in a circumference of the combustion plate and the body flange part, and wherein there is also disposed a thermal insulation material overlapping that portion of the combustion plate flange part which faces an inner space of the combustion box,
    characterized in: that a fixing plate for the thermal insulation material is attached to the combustion plate flange part; and that, provided a direction leaving away from the air-fuel mixture ejection part of the combustion plate is defined as an outward side direction, a side edge in the outward side direction of the fixing plate is provided with a bent edge part adapted to come into contact with a side edge in the outward side direction of the thermal insulation material, and also with a plurality of tongue-shaped pressing claws which are elongated from the bent edge part so as to press and prevent the thermal insulation material from getting released away from the fixing plate.

2. The combustion apparatus according to claim 1, wherein, as the thermal insulation material, there are disposed:
    a pair of first strip thermal insulation materials overlapping those portions of the combustion plate flange part which lie along first opposite sides that are predetermined set of opposite sides of a square which is a profile shape of the combustion plate;
    a pair of second strip thermal insulation materials overlapping those portions of the combustion plate flange part which lie along second opposite sides that are the other opposite set of sides of the square;
    wherein the strip fixing plate for fixing the first thermal insulation materials is attached to those portions of the combustion plate flange part which lie along the first opposite sides; and
    wherein each longitudinal end part of the fixing plate is provided with: a second bent edge part which comes into contact with a side edge in the outward side direction of each longitudinal end part of the second thermal insulation material; and a tongue-shaped second pressing claw which is elongated from the second bent edge part and which presses and prevent each longitudinal end part of the second thermal insulation material from getting released away from the fixing plate.

3. The combustion apparatus according to claim 2, wherein the combustion plate is disposed to cover a downward open surface of the burner body and wherein, in case a profile shape of the combustion plate is a rectangle, the first opposite sides are long sides of the rectangle.

4. The combustion apparatus according to claim 1, wherein the bent edge part of the fixing plate is provided with that projected part for positioning purpose which comes into contact with, or lies to face adjacent to an inner wall surface of the combustion box.

5. The combustion apparatus according to claim 1, wherein a positioning hole is formed in that portion of the fixing plate which overlaps a predetermined pressing claw, out of the plurality of pressing claws, and wherein a projected part formed in the combustion plate flanged part gets fitted into the positioning hole, whereby the fixing plate is positioned relative to the combustion plate flange part.

6. The combustion apparatus according to claim 1, wherein the plurality of pressing claws are connected to one another by a bridge part bridging over those base parts of the pressing claws which are on the side of the bent edge part of the pressing claws.

7. The combustion apparatus according to claim 1, wherein a stepped part is provided in a manner to protrude inward in that portion of the combustion box which is positioned below the fixing plate, and
    wherein the fixing plate is provided with a catching part which, in case the fixing plate falls away from the combustion plate flange part, will be caught by the stepped part so as to prevent the fixing plate from dropping.

* * * * *